United States Patent [19]

Wydeven et al.

[11] 4,137,365

[45] Jan. 30, 1979

[54] OXYGEN POST-TREATMENT OF PLASTIC SURFACES COATED WITH PLASMA POLYMERIZED SILICON-CONTAINING MONOMERS

[76] Inventors: James C. Fletcher, Administrator of the National Aeronautics and Space Administration, with respect to an invention of Theodore J. Wydeven, Jr., Sunnyvale; John R. Hollahan, San Francisco, both of Calif.

[21] Appl. No.: 779,883

[22] Filed: Mar. 21, 1977

Related U.S. Application Data

[63] Continuation-in-part of Ser. No. 634,304, Nov. 21, 1975, abandoned.

[51] Int. Cl.$^2$ .............................................. B05D 3/06
[52] U.S. Cl. .................................. 428/412; 427/40; 427/41; 428/447; 428/451
[58] Field of Search .................. 427/39, 40, 41, 38; 428/412, 447, 451

[56] References Cited

U.S. PATENT DOCUMENTS

| | | | |
|---|---|---|---|
| 3,310,424 | 3/1967 | Wehner et al. | 427/54 |
| 3,632,386 | 1/1972 | Hurst | 427/41 |
| 3,822,928 | 7/1974 | Smolinsky et al. | 428/447 |
| 3,953,115 | 4/1976 | French et al. | 427/40 |
| 4,018,945 | 4/1977 | Mehalso | 427/41 |
| 4,085,248 | 4/1978 | Zehender et al. | 427/38 |

FOREIGN PATENT DOCUMENTS

| | | | |
|---|---|---|---|
| 46534 | 8/1971 | Japan | 427/39 |

*Primary Examiner*—John H. Newsome
*Attorney, Agent, or Firm*—Armand McMillan; John R. Manning; Darrell G. Brekke

[57] ABSTRACT

The abrasion resistance of plastic surfaces coated with polymerized organosilanes can be significantly improved by post-treatment of the polymerized silane in an oxygen plasma. For optical purposes, the advantages of this post-treatment are developed with a transparent polycarbonate resin substrate coated with plasma polymerized vinyltrimethoxysilane.

6 Claims, 1 Drawing Figure

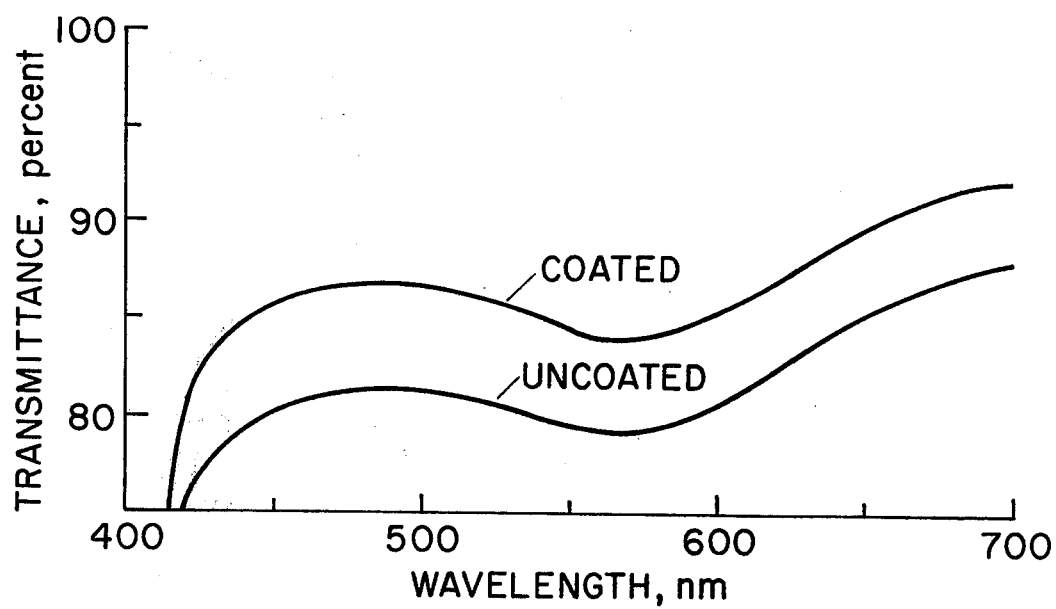

OXYGEN POST-TREATMENT OF PLASTIC SURFACES COATED WITH PLASMA POLYMERIZED SILICON-CONTAINING MONOMERS

ORIGIN

The invention described herein was made in the performance of work under a NASA contract and is subject to the provisions of Section 305 of the National Aeronautics and Space Act of 1957, Public Law 85-568 (72 Stat. 435; 42 U.S.C. 2457).

RELATED APPLICATION

This application is a continuation-in-part of application Ser. No. 634,304 filed on Nov. 21, 1975, now abandoned.

PRIOR ART

Synthetic plastic optical components are generally made from organic resins such as acrylics, polystyrenes, polycarbonates and the like. Such components possess several advantages over the more traditional glass and crystalline optical materials: lower production cost, resistance to thermal shock and mechanical stresses, lower weight, etc. Plastic optical components, however, have been found to be particularly vulnerable to abrasion, scratching and to environmental conditions, a vulnerability which often results in impairment if not complete destruction of their optical capabilities.

Numerous attempts have been made in the art to retard or eliminate the impairment of the optical capabilities of transparent plastic optical components. These attempts have often involved the application of some scratch resistant layer of material on the component by conventional methods which have included dip coating, electronic beam coating, ultraviolet polymerization and varnishing of the components' surface with a solution of the coating material followed by evaporation of the solvent. While some progress has been accomplished in these manners, the compositions and processes employed have tended to create additional problems with respect to cost, uniformity, adhesion, orientation and directionality requirements between the substrate and the origin of the coating composition. To illustrate the shortcomings of the methods of the art, one can consider the dip coating process which consists in immersing a substrate into a coating liquid, removing it from the liquid and drying it. One problem with this process is that the thickness of the resulting film is virtually beyond control. Furthermore, not only do films so prepared not show any durability at thicknesses under about one micron, but also they are generally too thick and not sufficiently uniform for use as optical coatings on a substrate having the complex geometry of a lens. Thick coatings (> 2 microns) in fact never exhibit both abrasion resistance and anti-reflective properties over the entire range of the visible spectrum ($\sim$ 4000 to 7000 Å).

Recent developments in the art of coating plastic substrates have involved the utilization of plasma or glow discharge polymerization of various organosilanes to achieve optical substrate coatings that are particularly resistant to environmental conditions and to systems in which transparent synthetic resins are subject to abrasive conditions. These plasma organosilane polymerization processes have yielded tenacious, uniform and optically clear coatings having physical thicknesses of up to 2 microns, and possessing satisfactory compatibility with acrylic, polystyrene, polycarbonate and other synthetic resin surfaces.

In this context, the object of this invention is to provide a method to improve the abrasion resistance of plasma polymerized organosilane coatings for optical plastic substrates. Another object is to provide coatings which are both abrasion resistant and anti-reflective coatings are desirable in that they increase the quantity of visible light transmitted by a plastic lens or optical element by decreasing the light loss caused by reflection from the surfaces of the lens or element.

SUMMARY OF THE INVENTION

It has now been discovered that it is possible to improve the abrasion resistance of an optically clear plastic substrate coated with a single layer of plasma-polymerized organosilane. This improvement is accomplished by treating the silane coated substrate in a low temperature oxygen plasma for a period of at least 100 seconds. It has also been discovered that the oxygen plasma treatment retains the anti-reflection properties of the silane coated substrate.

BRIEF DESCRIPTION OF THE DRAWING

The FIGURE shows the light transmission spectrum of optical quality polycarbonate, both uncoated and coated with the oxygen-treated film of this invention.

DETAILED DESCRIPTION

The coating processes utilized in this invention can be carried out in any of the plasma reactors described in U.S. Pat. No. 3,847,652. The configuration actually employed in the present embodiments however was one similar to that shown in FIG. 4 of said patent with the difference that external electrodes were used. The apparatus employed was operated substantially in the manner disclosed in the patent.

The compounds employed for coating the plastic substrates were organosilanes, compositions that have been found to be highly conformal and compatible with the synthetic resins conventionally used in optical components. When plasma polymerized onto the substrate surface, they provide adherent optically clear coatings up to 2 microns in thickness possessing superior abrasion resistance and excellent sealing capacity against moisture and other deleterious environmental influences. The organosilanes usable for this purpose, which can be employed singly or in any combination, include vinyltrichlorosilane, tetraethoxysilane, vinyltriethoxysilane, hexamethyldisilazane, tetramethylsilane, vinyldimethylethoxysilane, vinyltrimethoxysilane, tetravinylsilane, vinyltriacetoxysilane, and methyltrimethoxysilane. As to the plastic substrates that can benefit from the coatings described and from the post-coating treatment of the present invention, they include those materials conventionally used for the manufacture of plastic lenses and other optical components, for example, acrylics such as polymethylmethacrylate, polystyrenes, aromatic polycarbonates such as the polymers of bisphenol A with phosgene, aliphatic polycarbonates such as polymerized diethyleneglycol bis-(allyl)carbonate, and mixtures thereof.

A description of a preferred embodiment of the invention will now be provided in order to illustrate in greater detail operational techniques and specific conditions required for its practice. It will be evident to those skilled in the art that variations can be made in the procedures, the equipment and the materials employed without departing from the spirit and the scope of the invention as defined in the claims which follow this specification.

Preparation of Coated Plastic Substrate

Pieces of polished cast sheet stock of a bisphenol A-phosgene polycarbonate resin, available commercially under the mark Zelux C, having dimensions of 2.54 × 2.54 × 0.64 cm, were cleaned and then coated with vinyltrimethoxysilane in the manner described below. The cleaning was done by (1) dipping the plastic pieces in Freon solvent T-WD 602, a water dispersion of trichlorotrifluoroethane having an initial boiling point of 47° C at 760 mm; (2) rinsing them in a second solvent, e.g., trichlorotrifluoroethane; and (3) degreasing them in vapors of the latter liquid.

A plasma reactor similar in design to that of FIG. 4 of U.S. Pat. No. 3,847,652, but equipped with external electrodes, was employed. The reactor, 11 cm in diameter and 18 cm long, was connected to a liquid nitrogen trap in train with a vacuum pump. Except as shall be otherwise noted, the reactor and its accessories were set up and operated substantially in the manner described in the patent just mentioned.

The coating process was initiated by positioning the clean plastic substrate near the center of the cylindrical reactor in a polycarbonate resin frame supported on a glass plate. The reactor was evacuated to a background pressure of < 5 microns of mercury. The vinyltrimethoxysilane monomer was then allowed to flow in at the rate of 0.2 cm$^3$ STP/min., the monomer pressure being 15 microns Hg. No additive gas was used.

Instead of applying the radio frequency (RF) power continuously, as has been done previously, the 13.56 MHz RF power used was applied in a pulsed mode. The power was alternately on for 1.5 millisecond and off for 1.5 millisecond. The on-off cycle was continued for a total period of 4563 seconds. The peak-to-peak RF voltage across the plasma reactor with external electrodes was 400 volts, and this yielded a peak-to-peak plasma current of 600 milliamperes. At the end of the coating period, the monomer flow was stopped and the plasma reactor was evacuated before starting the oxygen plasma post-treatment. During the time period allowed, a polymer coating having a thickness of 2818 angstroms was deposited. The pulsed mode of operation employed minimized heat production during the deposition without producing any significant loss in deposition rate.

The Oxygen Plasma Post Treatment

The polymer coated plastic substrate in the evacuated reactor was then subjected to an oxygen plasma treatment under the following conditions:

| | |
|---|---|
| Oxygen pressure | 95 microns Hg. |
| Oxygen flow rate | 1.7 cm$^3$ STP/min. |
| Peak-to-peak | 390 volts |
| Peak-to-peak current | 580 milliamperes |
| Duration of treatment | 600 seconds. |

In this operation, the RF power was continuously applied. The plastic substrate was removed from the reactor, to be tested for abrasion resistance, reflection characteristics, and other relevant properties.

It should be noted here that the period of oxygen plasma treatment can vary somewhat, from about 100 seconds and up, depending on the particular silane used in the coating and the conditions selected for the treatment.

Abrasion Resistance

The abrasion resistance of coated and uncoated plastic substrate was tested with a rubber eraser substantially in the manner prescribed by military specification MIL-C-675A. However, a hazemeter was employed to measure the quantity of scattered transmitted visible light, i.e., the light scattered in passing through the coated transparent plastic substrate. Ordinarily, visual inspection of the abraded surface for damage, as suggested in the military specification, is considered sufficient. A hazemeter measurement, as obtained for instance with a Hunterlab D 55 H model equipped for Tabor abrasion measurements, is the ratio of the diffused or scattered light to the total light transmitted by a specimen and constitutes a quantitative measure of abrasion as opposed to the qualitative estimates provided by visual examination described in MIL-C-675A.

Various polycarbonate specimens, including one prepared in accordance with the present invention, yielded the haze values listed in Table I upon testing in the manner just specified.

TABLE I

| Hazemeter Measurements of Abrasion Resistance | | |
|---|---|---|
| Polycarbonate Specimens | Percent Haze | Number of Tests Averaged |
| Abraded | | |
| (a) Uncoated | 5.2 ± 0.8 | 10 specimens |
| (b) Coated * | 4.1 ± 0.5 | 3 specimens |
| (c) Coated * and Oxygen treated | 2.5 ± 0.2 | 6 specimens |
| Unabraded | | |
| (d) Uncoated | 2.3 ± 0.1 | 10 specimens |
| (e) Coated * | 2.2 ± 0.1 | 3 specimens |

*Coated with vinyltrimethoxysilane, as described earlier.

On examining these results, it becomes apparent that the least extent of damage from abrasion occurs in those coated specimens that have been post-treated in an oxygen glow discharge (c); they show a haze value only 0.2% greater than that of uncoated and unabraded polycarbonate (d). It is also apparent from the table that neither the silane coating (e) nor the oxygen treatment (c) significantly increase the haze of the polycarbonate (d). Table I also shows that the oxygen post-treatment (c) improves the abrasion resistance of coated specimens (b), the decrease in haze being in the order of 1.6%. Finally, as demonstrated in the prior art (copending application Ser. No. 634,304 filed on Nov. 21, 1975), plasma polymerized vinyltrimethoxysilane coatings also improve the abrasion resistance of polycarbonates as demonstrated by the 1.1% decrease between specimens (b) and (a).

Anti-reflection Characteristics

The anti-reflection characteristics of the abrasion resistant oxygen post-treated silane coating on polycarbonate are shown by the transmission spectrum of the drawing. The curves given represent the transmittance of a coated and an uncoated specimens in the visible light range, i.e., between 400 and 700 nm. It is apparent from these data that the oxygen treated abrasion resistant coating contributes to an increase in the transmission of visible light over the entire range of the visible spectrum. The thickness of the silane coating on the polycarbonate that was required to produce the spectrum of FIG. 1 was 939 angstroms, which required a deposition time of 1521 seconds.

Adhesion of the Coatings

The adhesion of the abrasion resistant and anti-reflection silane coatings to polycarbonate substrates was tested with fresh cellophane tape according to military specification MIL-C-675A. This test consists in applying the adhesive tape to the coated specimen and then removing it. The silane coatings on polycarbonate, with or without oxygen treatment, consistently passed this test in that not even small fragments of coating adhered to the tape on removal.

Chemical Composition of the Coatings

The surface composition of the plasma polymerized vinyltrimethoxysilane coatings were chemically analyzed by the electron spectroscopy for chemical analysis method (ESCA). The depth of analysis with the ESCA equipment employed was in the range of about 10 to 100 angstroms. The results obtained with vinyltrimethoxy silane films on polycarbonate substrates were the following:

TABLE III

| Specimen | Atom Percent, Surface | | | |
|---|---|---|---|---|
| | Carbon | Oxygen | Silicon | Hydrogen * |
| Untreated | 21.7 | 12.1 | 13.3 | 52.9 |
| $O_2$ post-treated | 13.7 | 24.2 | 9.1 | 53.0 |

*Obtained by difference

As the data indicates, although there is a significant decrease in the carbon and silicon contents of the coating's surface region, there remains a fair quantity of carbon atoms (about 14%) in said region which has been subjected to the oxygen plasma.

Although the present invention has been disclosed in terms of its preferred embodiment, it will be understood that many variations in compositions and processes can be carried out by the man skilled in the art without departing from its scope and its spirit as defined by the following claims.

What is claimed is:

1. A method for improving the abrasion resistance of polymerized organosilane coatings on a plastic substrate which comprises treating the silane coated substrate in an oxygen plasma.

2. The method of claim 1 wherein the polymerized organosilane coating is a plasma polymerized monomer selected from the group consisting of vinyltrichlorosilane, tetraethoxysilane, vinyltriethoxysilane, tetravinylsilane, vinyltriacetoxysilane, hexamethyldisilazane, tetramethylsilane, vinyldimethylethoxysilane, vinyltrimethoxysilane, methyltrimethoxysilane and mixtures thereof.

3. The method of claim 1 wherein the plastic substrate consists of a resin selected from the group consisting of acrylic resins, polystyrenes, aromatic and aliphatic polycarbonates, and mixtures thereof.

4. A method for the production of an optical element combining improved abrasion resistance with anti-reflective characteristics, comprising applying by plasma polymerization to an optically clear polycarbonate resin substrate, a coating of vinyltrimethoxysilane, and subsequently subjecting the coated substrate to an oxygen plasma for a period of at least about 100 seconds.

5. A plastic substrate coated with an oxygen plasma treated polymer of an organosilane compound.

6. An optical component comprising a clear polycarbonate resin substrate coated with a plasma polymerized layer of vinyltrimethoxysilane that has been treated in an oxygen plasma after deposition on the substrate.

* * * * *